Figure 1:
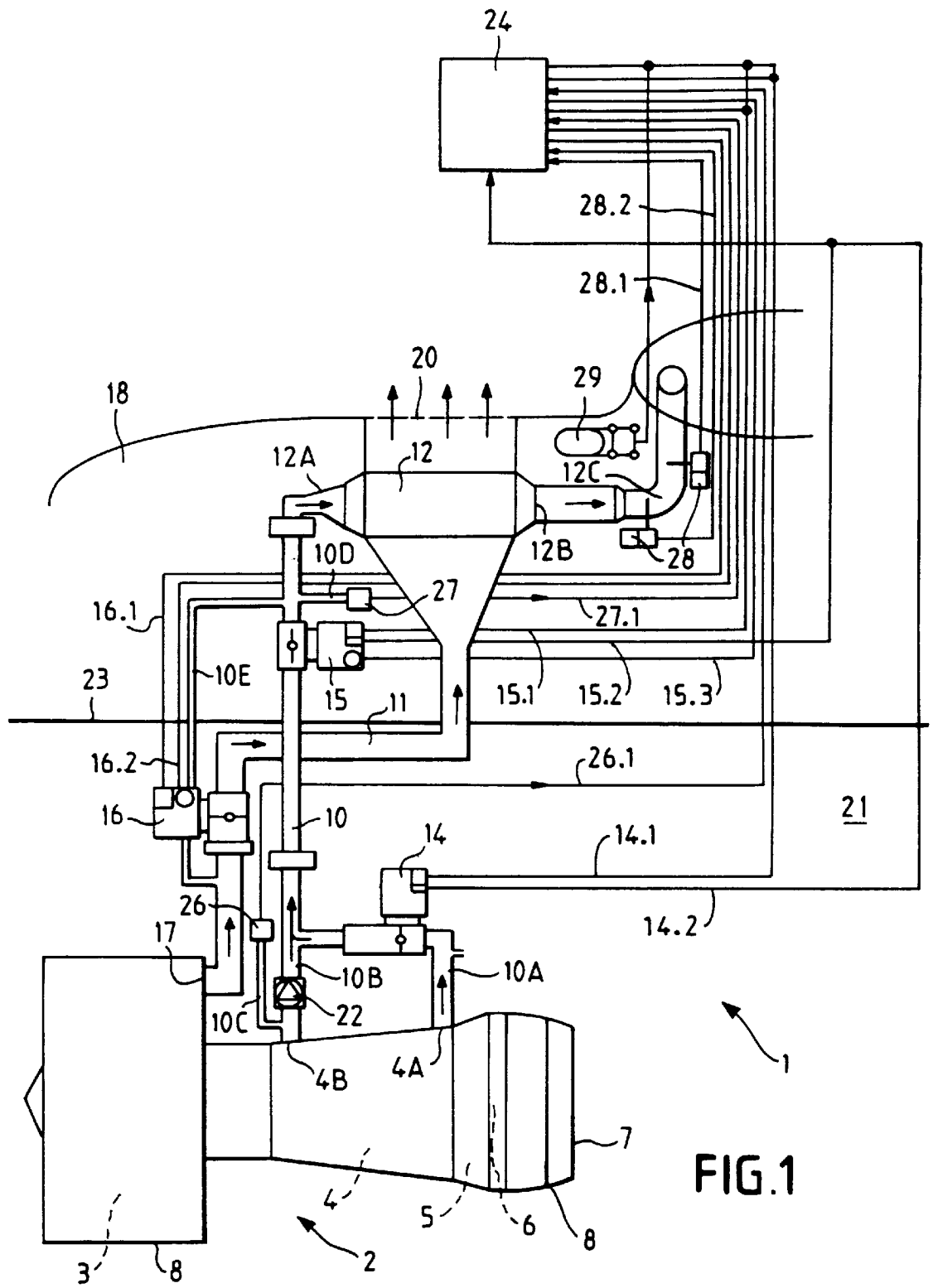

United States Patent
Monfraix et al.

[11] Patent Number: 6,058,725
[45] Date of Patent: May 9, 2000

[54] AIRCRAFT HOT-AIR SUPPLY SYSTEM

[75] Inventors: Jean Henri Monfraix, Leguevin; Hélène Lise Cahingt, Toulouse; Didier Pascal Robert Poirier, Blagnac; Pierre Michel François Pradeau, Verfeil, all of France

[73] Assignees: Aerospatiale Societe Nationale Industrielle, Paris; Liebherr-Aerospace Toulouse S.A., Toulouse, both of France

[21] Appl. No.: 09/244,434

[22] Filed: Feb. 4, 1999

[30] Foreign Application Priority Data

Feb. 5, 1998 [FR] France .................................. 98 01351

[51] Int. Cl.⁷ .................................................. G05D 23/00
[52] U.S. Cl. ................................. 62/172; 454/74; 165/235
[58] Field of Search ................................ 62/172, 86, 87, 62/88, 401, 402; 236/34, 34.5, 35, 49.3; 454/70, 71, 72, 74, 75; 165/235, 299, 300

[56] References Cited

U.S. PATENT DOCUMENTS

| | | | |
|---|---|---|---|
| 2,562,918 | 8/1951 | Hynes | 454/74 |
| 2,917,288 | 12/1959 | Sims, Jr. et al. | 165/235 |
| 3,878,692 | 4/1975 | Steves | 62/172 X |
| 4,285,466 | 8/1981 | Linscheid et al. | 236/13 |
| 4,617,958 | 10/1986 | Seidel et al. | 137/492.5 |
| 5,155,991 | 10/1992 | Bruun | 454/74 X |

FOREIGN PATENT DOCUMENTS

| | | |
|---|---|---|
| 0190943 | 8/1986 | European Pat. Off. . |
| 0507725 | 10/1992 | European Pat. Off. . |
| 0511935 | 11/1992 | European Pat. Off. . |
| 0337830 | 10/1989 | France . |

*Primary Examiner*—Harry B. Tanner
*Attorney, Agent, or Firm*—Stevens, Davis, Miller & Mosher, L.L.P.

[57] ABSTRACT

The present invention relates to a hot-air supply system for an aircraft equipped with at least one engine (2) with a fan (3) and compressors (4). According to the invention, the regulating devices (14, 15, 16) intended to regulate the flows of hot air and of cold air sent by the pipes (10 and 11) to the heat exchanger (12) are pneumatic, controlled electrically, and are controlled by a centralized management device (24).

9 Claims, 4 Drawing Sheets

AIRCRAFT HOT-AIR SUPPLY SYSTEM

The present invention relates to an aircraft hot-air supply system.

It is known that, particularly to run cabin air-conditioning units on aircraft, units for deicing the aerodynamic surfaces of the wing structure, etc, hot air generated by an engine or by each engine of the aircraft is bled off to obtain air regulated to the desired pressure and temperature and thus supply said units.

There are already known, for example from document EP-A-0 511 935, hot-air supply systems for an aircraft equipped with at least one engine with a fan and compressors, comprising:

a first pipe which bleeds pressurized hot air off said compressors and on which there are mounted a flow-regulating valve and a pressure-regulating valve, said valves respectively comprising a controlled member capable of controlling the passage of hot air through said first pipe;

a second pipe, which bleeds pressurized cold air off said fan and on which is mounted a flow-regulating valve, said valve comprising a controlled member capable of controlling the passage of cold air through said second pipe;

a pre-cooling heat exchanger to which said first and second pipes are connected;

an air-temperature detector, placed at the outlet from said heat exchanger;

an air-pressure detector, placed on said first hot-air bleed pipe; and a control device receiving electrical signals representing measurements from said temperature detector and from said pressure detector and controlling said hot-air flow-regulating valve.

In these known systems, command and control of said regulating devices are pneumatic or mechanical. This gives rise to a certain number of drawbacks:

first of all, they can only run at predetermined air temperatures or pressures, which means that the way they operate is rigid and cannot be constantly adapted to suit;

when said systems are of the pneumatic type, they need to have pneumatic connecting hoses for transmitting gas pressure information and orders. Such connecting hoses are difficult to install and liable to leaks which are difficult to detect and to locate. What is more, replacing them requires a lengthy and expensive check. Thus, troubleshooting and maintenance of such pneumatic systems are tricky, difficult and expensive;

when said systems are of the mechanical type, their mechanical components are subject to wear during operation, which means that the clearances and friction drift over time and that numerous and frequent adjustments need to be made. Here too, maintaining said systems is tricky, difficult and expensive.

The object of the present invention is to overcome these drawbacks.

To this end, according to the invention, the aircraft hot-air supply system, of the type mentioned hereinabove, is noteworthy:

in that said hot-air flow-regulating valve, said hot-air pressure-regulating valve and said cold-air flow-regulating valve each comprise a control unit capable of controlling the corresponding controlled member;

in that each of said control units comprises electrically controlled means capable of bleeding pressurized air from said first and second pipes to actuate said corresponding controlled member pneumatically; and in that said control device, in addition to controlling said hot-air flow-regulating valve controls said hot-air pressure-regulating valve and said cold-air flow-regulating valve, thus providing said system with centralized management.

Thus, according to the present invention, said pneumatically powered regulating devices are electrically controlled, which means that:

the air pressures and temperatures delivered can be varied and adapted to suit, the operation of the system in accordance with the present invention therefore being very flexible;

troubleshooting and maintenance of the electrical connections are easier than the corresponding operations on pneumatic connections; and the mechanical components are few in number and this therefore obviates the frequent adjustment needed on mechanical systems.

Advantageously, to make troubleshooting and maintenance of the system in accordance with the present invention still easier, it is advantageous for each of said control units to form a single constructional entity with the corresponding controlled member, it thus being possible for said constructional entity to be placed near to one or other of the first and second air pipes.

It is advantageous for said hot-air pressure detector to be mounted between the pressure-regulating valve and the heat exchanger.

In an advantageous embodiment, in which said first hot-air bleed pipe has, at the same end as said compressors, two separate paths, one of which is connected to the high-pressure stages of said compressors and comprises said hot-air flow-regulating valve, and the other of which is connected to the intermediate-pressure stages of said compressors and comprises a one-way mechanical valve, said system in accordance with the present invention comprising an additional air pressure detector arranged on said other branch of said first hot-air bleed pipe, between said one-way mechanical valve and said intermediate-pressure stages of said compressors, said additional air ressure detector sending said control device electrical signals representing its measurements.

It is thus possible mainly to use hot air at intermediate pressure to supply the user units and to call upon high-pressure hot air only when the intermediate-pressure hot air is insufficient to meet the hot-air requirements of said units.

As a preference, the controlled member of said hot-air flow-regulating valve is a pivoting butterfly arranged in the first pipe near the outlet from the high-pressure stages of said compressors, and the control unit of said hot-air flow-regulating valve comprises:

a pneumatic actuator, mechanically connected to said butterfly so as to pivot it;

a branched-off pipe placing said actuator in communication with said first pipe, upstream of said butterfly; and an electric actuator electrically connected to said control device and controlling the passage of hot air through said branched-off pipe.

Likewise, the controlled member of said hot-air pressure-regulating valve may be a pivoting butterfly arranged in said first hot-air pipe, and the control unit for said hot-air pressure-regulating valve may comprise:

a pneumatic actuator, mechanically connected to said butterfly so as to pivot it;

a branched-off pipe placing said actuator in communication with said first pipe, upstream of said butterfly; and an electric actuator electrically connected to said control device and controlling the passage of hot air through said branched-off pipe; and modification means controlled electrically by said control device and modifying the amount of hot air sent to said actuator through said branched-off pipe.

Said hot-air pressure and flow-regulating valves may comprise a pressure reducer mounted on said branched-off pipe.

The controlled member of said cold-air flow-regulating valve may also be a pivoting butterfly arranged in said second cold-air pipe, and the control unit for said cold-air flow-regulating valve may comprise:

a pneumatic actuator, mechanically connected to said butterfly so as to pivot it;

a branched-off pipe placing said actuator in communication with said first hot-air pipe, downstream of said hot-air pressure-regulating valve; and modification means controlled electrically by said control device and modifying the amount of cold air sent to said actuator through said branched-off pipe.

In said cold-air flow-regulating valve, a pipe may connect said second cold-air bleed pipe, upstream of the pivoting butterfly, to said modification means, to provide them with cooling.

Thus, the three regulating valves are controlled electrically, work pneumatically, and the amounts of air flowing through the high-pressure valve and through the cold-air inlet valve may advantageously be modified to suit by said modification means, so as to optimize the performance of the hot-air supply system in accordance with the present invention.

The figures of the appended drawing will make it easy to understand how the invention may be achieved. In these figures, identical references denote similar elements.

FIG. 1 diagrammatically illustrates a hot-air supply system in accordance with the present invention.

Figure 2:
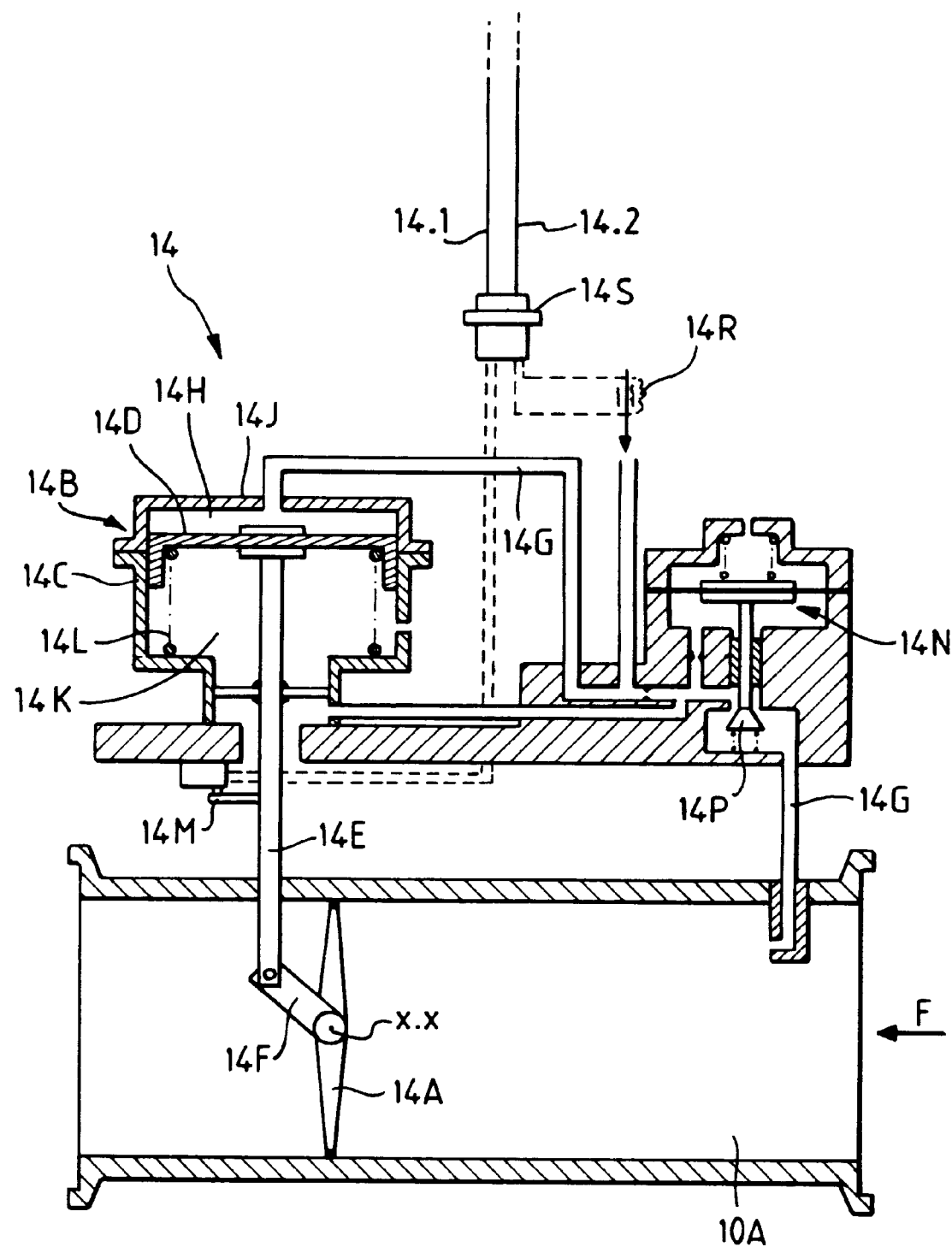
Figure 3:
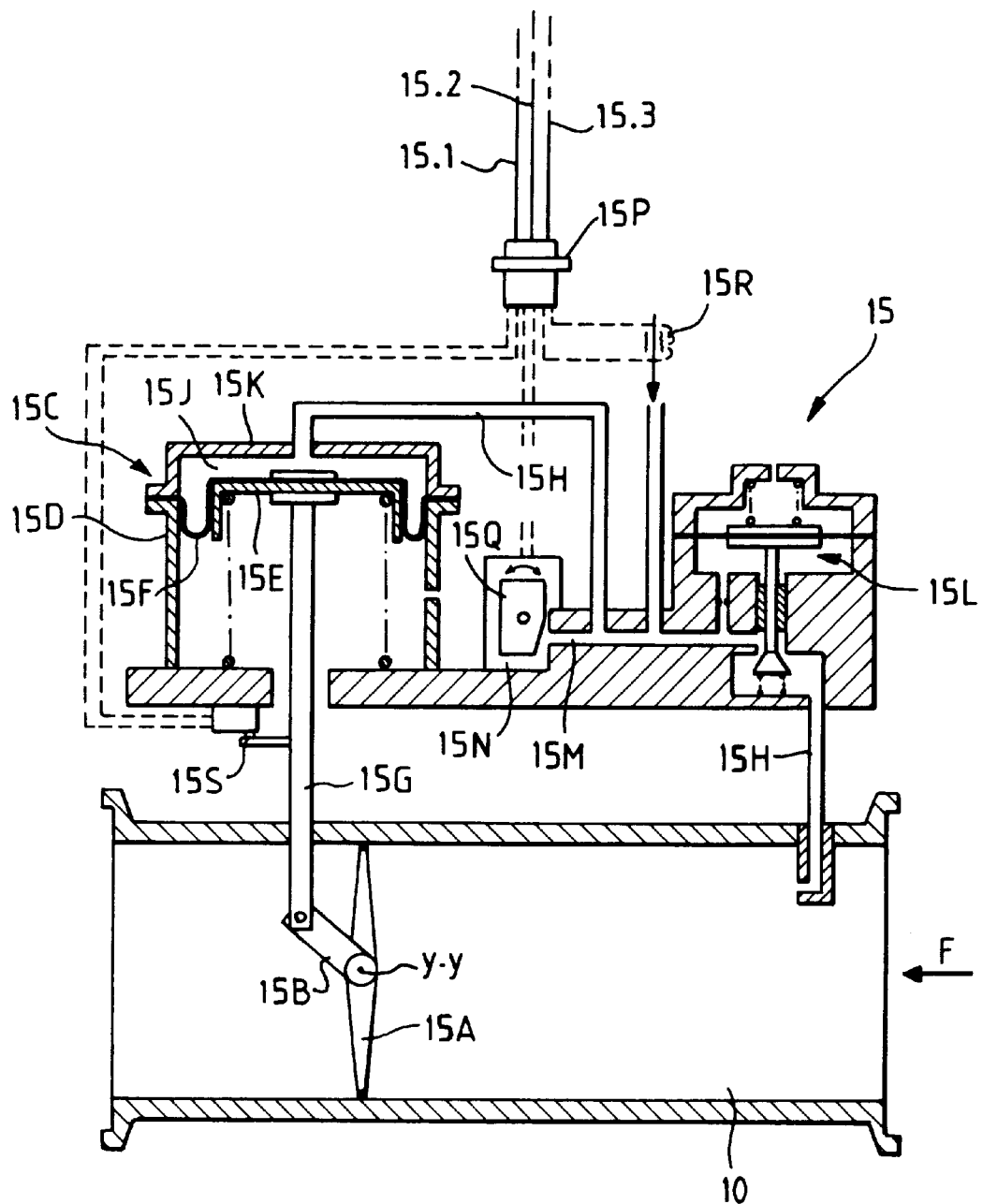
Figure 4:
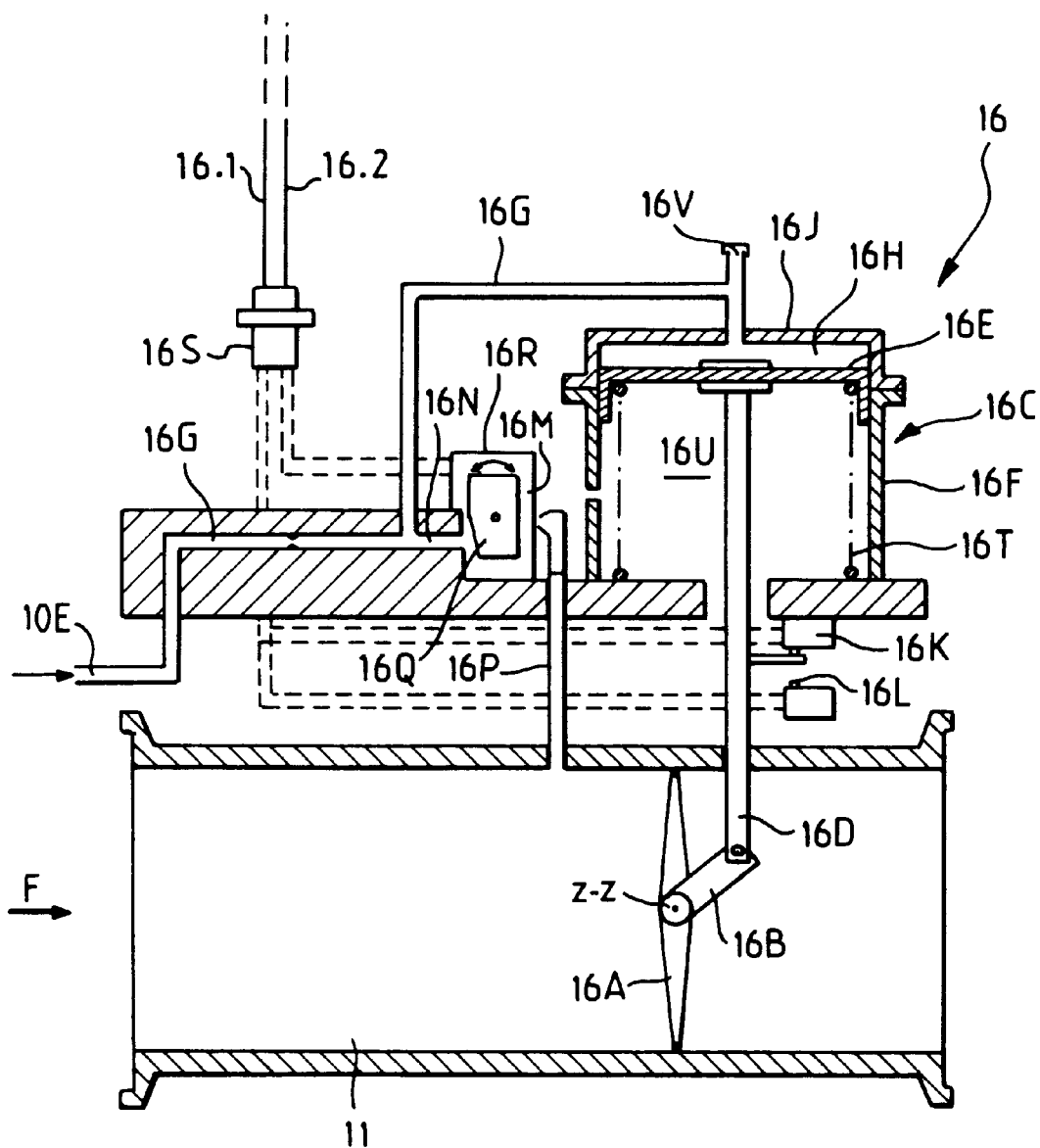

FIGS. 2, 3 and 4 illustrate, diagrammatically, in section, some regulating devices of the system of FIG. 1.

The system 1 in accordance with the present invention and shown in FIG. 1 is associated with an aircraft jet engine 2 from which hot air is bled to provide air regulated to a desired pressure and temperature to units that use such air (not depicted), such as, for example, the cabin air-conditioning unit for said aircraft, the unit for deicing the aerodynamic surfaces thereof, etc.

The jet engine 2 is of the bypass fan jet type and comprises, usually and schematically, from the upstream to the downstream direction:

a fan 3;

low and high pressure compressors 4;

a combustion chamber 5;

turbines 6; and a jet pipe 7.

Protective cowlings 8 envelop the various above elements, in a way known per se.

The system 1 comprises a hot-air bleed pipe 10, a cold-air bleed pipe 11, a pre-cooling heat exchanger 12 and regulating devices 14, 15 and 16 regulating the flow rates of the hot air and of the cold air flowing along the pipes 10 and 11 to provide, at the outlet from the exchanger 12, a flow of air which is regulated in terms of temperature and in terms of pressure.

More specifically, the hot-air pipe 10 connects the compressors 4 of the jet engine 2 to the inlet 12A of the exchanger 12. At the same end as the jet engine 2, the bleed pipe 10 splits into two separate paths 10A and 10B connected respectively to an orifice 4A placed at the exit from the high-pressure stages of the compressors 4 and to an orifice 4B placed at the exit from the intermediate-pressure or medium-pressure stages of said compressors 4. The cold-air bleed pipe 11 places the fan 3 in communication with the heat exchanger 12 via an air tapping 17 made in the corresponding cowling 8 downstream of the fan. This heat exchanger thus has the cold air from the fan passing through it transversely to cool the hot air flowing through the exchanger from its inlet 12A to its outlet 12B. The exchanger 12 is arranged in the stub 18 that supports the engine 2, and there is a grating 20 in said stub for discharging the cold air that has passed through said exchanger 12. regulating device 14, mounted on the path 10A of the hot-air pipe 10 of the system, is in the form of a high-pressure valve capable of controlling the passage of hot air from the high-pressure stages of compressors 4 (orifice 4A) to the inlet 12A of the exchanger 12 through the pipe 10. The valve 14 is situated in the pod 21 of the jet engine 2. Arranged on the path 10B of the pipe 10 is a one-way mechanical valve 22 capable of controlling the passage of hot air from the medium-pressure stages of the compressors (orifice 4B) to the inlet 12A of the exchanger, through the pipe 10. This valve 22 is also situated in the jet engine pod.

In addition, arranged on the pipe 10, at the same end as the inlet 12A to the exchanger 12, is the regulating device 15 which is in the form of a pressure-regulating valve placed in the stub 18 and separated, by a firewall 23, from the pod 21 of the jet engine in which the valves 14 and 22 are provided.

The regulating device 16 is arranged on the cold-air pipe 11 and is also in the form of a valve transmitting the cold air from the fan 3 to the heat exchanger 12. The valve 16 is located in the stub 18 of the jet engine 2, but in the hot part, between the firewall 23 and the jet engine 2.

According to the invention, the high-pressure valve 14, the pressure-regulating valve 15 and the cold-air inlet valve 16 are electrically controlled and are connected, by respective electrical connections 14.1, 14.2–15.1, 15.2, 15.3–16.1, 16.2, to a centralized management device 24 delivering, as need be, the electric operating commands to said valves 14, 15 and 16.

Also connected to the centralized management device 24, by corresponding electrical connections 26.1, 27.1, 28.1, 28.2, are:

a transfer pressure sensor 26 which communicates, via a branch-off 10C, with the path 10B of the pipe 10 for measuring the pressure upstream of the one-way mechanical intermediate pressure valve 22 and transmitting the measurement to the management device 24 to automatically, if necessary, transfer the air bleed from the orifice 4A to the orifice 4B;

a bleed pressure sensor 27, which communicates, via a branch-off 10D, with the hot-air pipe 10 and the measurement of which is transmitted to the management device 24 to command and control the hot-air pressure downstream of the regulating valve 15, before it enters the exchanger, and to automatically, if necessary, transfer the bleed from the orifice 4B to the orifice 4A when the pressure in the medium-pressure orifice 4B is not sufficient to meet the bleed pressure demand;

two bleed temperature sensors 28, located in series in the outlet pipe 12C from the heat exchanger 12, transmitting the measurements to the management device 24 which controls the temperature of the air supplied to the units, this eliminating risks of excessively high temperature.

An element 29, capable of detecting ambient or environmental overheat, is also provided on the stub 18, near to said exchanger 12 and is also connected to the management device 24 to which it sends its measurements.

Structurally, the high-pressure valve 14 (depicted in diagrammatic section in FIG. 2) is of the type with a butterfly 14A pivoting about an axis x—x (perpendicular to the plane of FIG. 2) and mounted in the path 10A of the pipe 10 and is capable of closing or opening the hot-air passage from the high-pressure compressors (arrow F) toward the exchanger 12.

The valve 14 comprises an operating unit or actuator 14B, operated pneumatically, connected mechanically to the butterfly 14A and consisting, in the manner of a double-acting ram, of a cylinder 14C inside which there may slide, in sealed fashion, a piston 14D which actuates the butterfly 14A via mechanical transmission members of the connecting rod 14E and wrist pin 14F type.

Furthermore, a branched-off pipe 14G, formed in the valve 14, places the path 10A in communication, upstream of the butterfly 14A with respect to the direction of flow F of the hot air, with a chamber 14H of the actuator, which chamber lies between the closed end 14J of the cylinder and the piston 14D. Placed in the chamber 14K which is at the opposite end to the previous chamber is a return spring 14L which causes the butterfly 14A to close. An end-of-travel switch 14M also indicates whether the valve is in the closed or unclosed position. What is more, a pressure reducer 14N fitted with a valve 14P is arranged on the branched-off pipe 14G to deliver a constant pressure to the chamber 14H of the actuator 14B and thus reduce the pressure charge of the hot-air path therein.

The electrical control of the opening and closure of the valve 14 is provided by a solenoid 14R acting (as illustrated only diagrammatically) at the branched-off pipe 14G of the valve, to control the passage of hot air through the latter pipe.

The solenoid 14R and the end-of-travel switch 14M are electrically connected to the management device 24, via a connector 14S, to which the electrical connections 14.1 and 14.2 are connected.

The pressure-regulating valve 15, depicted diagrammatically in FIG. 3, is also of the type with a butterfly 15A pivoting about an axis y—y (perpendicular to the plane of FIG. 3) and mounted in the pipe 10 to open or close the hot-air circulation toward the exchanger 12. Its purpose is to regulate the pressure of the hot air supplied, after passing through the exchanger 12, to the user units so as to reduce the stress on the components located downstream when the pressure at which this air is bled from the engine is high.

The valve 15 has a structure similar to that of the valve 14 and it comprises a control unit or pneumatic actuator 15C (or single-acting ram), consisting of a cylinder 15D and of a piston 15E equipped with a flexible diaphragm 15F and extended by a rod 15G. The free end of this rod is articulated to a wrist pin 15B which forms an integral part of the butterfly 15A. A branched-off pipe 15H is formed in the valve 15 and places the inside of the pipe 10, upstream of the butterfly 15A with respect to the direction of flow F of the hot air, in communication with the internal chamber 15J of the actuator 15C, which chamber lies between the closed end 15K of the cylinder and the piston 15E with diaphragm. There is also a pressure reducer 15L on the branched-off pipe 15H to which there is connected, between the reducer and the actuator, a venting passage 15M, the cross section of which is controlled by a cam 15Q actuated by a torque motor 15N. This is incorporated into the valve 15 and can, depending on the position of said valve 15Q, cause a drop in pressure in the branched-off pipe 15H (via the passage 15M) and thus control the position of the butterfly 15A by modifying the air pressure transmitted to the chamber 15J of the actuator 15C. To do this, the torque motor 15N is connected to and electrically controlled by the management device 24 as required. The valve 15 also comprises a solenoid 15R controlling (in a similar way to the solenoid 14R) the opening and closure of the valve 15 by controlling the passage of hot air through the branched-off pipe 15H, and an end-of-travel switch 15S indicating whether the valve 15 is in the closed or unclosed position. The torque motor 15N, the solenoid 15R and the end-of-travel switch 15S are electrically connected to the management device 24 via a connector 15P to which the electrical connections 15.1, 15.2 and 15.3 are connected.

The cold-air inlet valve 16 arranged in the pipe 11 is depicted in FIG. 4 and is also, according to the invention, controlled electrically to operate pneumatically. Like the valves 14 and 15, the valve 16 is of the type with a butterfly 16A pivoting about an axis z—z (perpendicular to the plane of FIG. 4) and it is mounted on the pipe 11 to shut off or open the passage of cold air from the fan 3. For this purpose, it comprises a control unit or actuator 16C which operates pneumatically (or single-acting ram) which controls the butterfly 16A via the rod 16D of a piston 16E mounted to slide, in sealed manner, in cylinder 16F of the actuator, the free end of the rod 16D being connected to the butterfly by a wrist pin 16B.

Pneumatic control of the actuator 16C is provided, as before, by a branched-off pipe 16G placing one path 10E of the hot-air pipe 10 of the regulating valve 15, downstream of this valve, in communication with the chamber 16H of the actuator between the piston 16E and the closed end 16J of the cylinder. Two end-of-travel switches, closed/not closed (16K) and open/not open (16L) are connected to the actuator, while a torque motor 16M, associated with a cam 16Q, controls the cross section of an air intake 16N made in the branched-off passage 16G. This torque motor 16M controls the position of the butterfly 16A between its closed and open positions by modifying the pressure sent into the chamber 16H of the actuator 16C.

Because it is located in a hot region, the torque motor 16M is ventilated by a flow of cold air flowing through a tube 16P connecting the cold-air pipe 11, upstream of the butterfly, to the torque motor. This motor is also surrounded by a protective shroud 16R.

The torque motor 16M and the switches 16K, 16L are connected to the management device 24 via a connector 16S to which the electrical connections 16.1 and 16.2 are connected.

Furthermore, a return spring 16T is arranged in the chamber 16U of the actuator, which is the opposite chamber to the chamber 16H, to spontaneously return the piston to its position in which it is retracted inside the cylinder, and thus cause the pipe to be closed by the butterfly.

The way in which the system and the various members of which it is made operate is as follows.

The one-way valve 22 is constantly open and sends the exchanger 12 hot air that passes through the orifice 4B. This hot air is limited in terms of pressure, temperature and flow rate.

Also, if the requirement for regulated air exceeds the capabilities of the one-way valve 22 alone, a situation which is detected by the sensors 26, 27 and 28, the high-pressure valve 14 is opened electrically by the centralized management device 24 and lets pressurized hot air in through the bleed orifice 4A, at the same time minimizing the bleed from the high-pressure compressors 4 of the jet engine 2. When the valve 14 is operational, that is to say when there is not enough pressure coming from the valve 22, the bled hot air, which emerges from the path 10A, then flows along the pipe 10 and is prevented from traveling toward the orifice 4B by the one-way valve 22.

The way in which the valve 14 works is as follows. Once the solenoid 14R has been energized by the management device 24, the branched-off pipe 14G opens and hot air enters the branched-off passage 14G and enters the chamber 14H of the actuator 14B. This deploys the piston 14D and thus causes the butterfly 14A to pivot from its closed position toward an open position, via the rod 14E and the wrist pin 14F, which opens the path 10A and allows the hot gases to travel toward the regulating valve 15 along the pipe 10.

It will be noted that the valve 14 can open only if, simultaneously, the solenoid is energized by the management device 24 and there is a pressure upstream of the valve 14; if there is no pressure upstream of the valve 14 then the butterfly 14A cannot pivot, even if the branched-off pipe 14G is opened by the solenoid 14R. If, on the other hand, there is pressure upstream of the valve 14, but the solenoid has not been energized, particularly as a result of a break in the electrical power supply, the pipe 14G is not opened and the valve 14 remains closed.

Pressurized hot air leaving the valve 14 flows along the pipe 10 and reaches the pressure-regulating valve 15, operation of which is controlled electrically by the solenoid 15R in response to an order from the management device 24. The hot air enters the branched-off passage 15H, passes through the pressure reducer 15L and travels into the actuator 15C. The amount of hot air to be supplied to the chamber 15J of the actuator as a function of the requirement is controlled by the torque motor 15N which is controlled electrically by the management device 24 and which communicates with the pipe 15H via the passage 15M. It regulates the leakage of hot air depending on how far it has been made to move and thus makes it possible to modify the amount of hot air sent to the actuator 15C and hence cause the butterfly 15A to pivot by an appropriate amount in the pipe 10, depending on the movement of the piston 15E with diaphragm 15F and of its rod 15G.

The valve 15 in particular reduces the stress on the components located downstream when the bleed pressure is high. If there is pressure upstream and if the solenoid 15R is energized, then the regulating valve 15 is controlled by the torque motor. If there is no pressure upstream or if the solenoid is de-energized, the regulating valve 15 is closed. It can be seen that for safety reasons, if there is enough pressure upstream, but no electrical power supply to the torque motor, the valve 15 is closed. This mode of operation guarantees that the valve 15 remains in the closed position if there is a break in the electrical power supply.

The hot air leaving the regulating valve 15 then travels toward the inlet 12A of the heat exchanger 12 of the system 1.

At the same time, the inlet valve 16 supplies old air to the exchanger, through the pipe 11. For that, some of the hot air, downstream of the valve 15, enters the pipe 10E then the branched-off pipe 16G of the valve 16 to re-emerge in the chamber 16H of the actuator 16C. Here too, the torque motor 16M, communicating with the pipe 16G via the pipe 16N and controlled electrically by the centralized management device 24, allows the amount of air acting in the actuator to be modified, and this, via the piston 16E, the rod 16D and the wrist pin 16B, causes the desired pivoting of the butterfly 16A in the pipe 11.

If there is no pressure conveyed by the pipe 10E into the actuator, the valve 16 remains closed. This allows the valve to be closed in the event of a fire in the engine 2 (the valve 16 is driven toward its fully closed position thanks to a thermal fuse 16V connected to the passage 16G). With an actuating pressure in the bleed pipe 10E downstream of the valve 15, but with no power supply to the torque motor 16H, the inlet valve 16 is open to prevent overheating of the bleed in the event of a loss of electrical power. In addition, the inlet valve 16 is closed by the device 24 via the torque motor.

A regulated air flow at given temperature and pressure is therefore obtained at the exit 12B of the heat exchanger 12 and sent to the user units of the aircraft.

If the requirement for regulated air can be met simply by the intermediate pressure valve 22, then the valve 14 is closed and the hot air from the orifice 4B of the compressors is sent to the heat exchanger 12 along the path 10B, the pipe 10 and the regulating valve 15. At the same time, cold air from the cold-air pipe 11 also passes through the heat exchanger.

From the foregoing it can be seen that, by virtue of the present invention, the bleed pressure can be varied according to the requirement of the user units, by virtue of the torque motors and of the sensors, instead of having to be set at a maximum value which leads the system to be overspecified independently of the actual requirement. The control of the temperature of the bleed may also be varied instead of being set at one or two fixed values, as it is in known systems. In the pressure-regulating valve 15, control of the hot-air bleed is advantageously redundant via the solenoid 15R and the torque motor 15N.

We claim:

1. A hot-air supply system for an aircraft equipped with at least one engine (2) with a fan (3) and compressors (4), comprising:

a first pipe (10) which bleeds pressurized hot air off said compressors (4) and on which there are mounted a flow-regulating valve (14) and a pressure-regulating valve (15), said valves respectively comprising a controlled member (14A or 15A) capable of controlling the passage of hot air through said first pipe;

a second pipe (11), which bleeds pressurized cold air off said fan (3) and on which is mounted a flow-regulating valve (16), said valve comprising a controlled member (16A) capable of controlling the passage of cold air through said second pipe;

a pre-cooling heat exchanger (12) to which said first and second pipes (10 and 11) are connected;

an air-temperature detector (28), placed at the outlet from said heat exchanger (12);

an air-pressure detector (27), placed on said first hot-air bleed pipe (10);

a control device (24) receiving electrical signals representing measurements from said temperature detector (28) and from said pressure detector (27) and controlling said hot-air flow-regulating valve (14), wherein:

said hot-air flow-regulating valve (14), said hot-air pressure-regulating valve (15) and said cold-air flow-regulating valve (16) each comprise a control unit (14B, 15C, 16C) capable of controlling the corresponding controlled member (14A, 15A, 16A);

each of said control units (14B, 15C, 16C) comprises electrically controlled means capable of bleeding pressurized air from said first and second pipes (10, 11) to actuate said corresponding controlled member (14A, 1SA, 16A) pneumatically; and said control device (24), in addition to controlling said hot-air flow-regulating valve (14) controls said hot-air pressure-regulating valve (15) and said cold-air flow-regulating valve (16), thus providing said system with centralized management.

2. A system as claimed in claim 1, wherein each of said control units (14B, 15C, 16C) forms a single constructional entity with the corresponding controlled member (14A, 15A, 16A).

3. A system as claimed in claim 1, wherein said hot-air pressure detector (27) is mounted between the pressure-regulating valve (15) and the heat exchanger (12).

4. A system as claimed in claim 1, in which said first hot-air bleed pipe (10) has, at the same end as said compressors (4), two separate paths (10A, 10B), one (10A) of which is connected (at 4A) to the high-pressure stages of said compressors (4) and comprises said hot-air flow-regulating valve (14), and the other (10B) of which is connected (at 4B) to the intermediate-pressure stages of said compressors (4) and comprises a one-way mechanical valve (22), and which comprises an additional air pressure detector (26) arranged on said other branch (10B) of said first hot-air bleed pipe (10), between said one-way mechanical valve (22) and said intermediate-pressure stages of said compressors (4), said additional air pressure detector (26) sending said control device (24) electrical signals representing its measurements.

5. A system as claimed in claim 1, wherein the controlled member of said hot-air flow-regulating valve (14) is a pivoting butterfly (14A) arranged in the first pipe (10) near the outlet (4A) from the high-pressure stages of said compressors (4), and wherein the control unit of said hot-air flow-regulating valve (14) comprises:

a pneumatic actuator (14B), mechanically connected to said butterfly (14A) so as to pivot it;

a branched-off pipe (14G) placing said actuator (14B) in communication with said first pipe (10), upstream of said butterfly (14A); and an electric actuator (14R) electrically connected to said control device (24) and controlling the passage of hot air through said branched-off pipe (14G).

6. A system as claimed in claim 1, wherein the controlled member of said hot-air pressure-regulating valve (15) is a pivoting butterfly (15A) arranged in said first hot-air pipe (10), and wherein the control unit for said hot-air pressure-regulating valve (15) comprises:

a pneumatic actuator (15C), mechanically connected to said butterfly (15A) so as to pivot it;

a branched-off pipe (15H) placing said actuator (15C) in communication with said first pipe, upstream of said butterfly (15A); and an electric actuator (15R) electrically connected to said control device (24) and controlling the passage of hot air through said branched-off pipe (15H); and modification means (15N) controlled electrically by said control device (24) and modifying the amount of hot air sent to said actuator through said branched-off pipe (15H).

7. A system as claimed in claim 5, wherein said regulating valve (14, 15) with pivoting butterfly (14A, 15A) comprises a pressure reducer (14N, 15L) mounted on said branched-off pipe (14G, 15H).

8. A system as claimed in claim 1, wherein the controlled member of said cold-air flow-regulating valve (16) is a pivoting butterfly (16A) arranged in said second cold-air pipe (11), and wherein the control unit for said cold-air flow-regulating valve (10) comprises:

a pneumatic actuator (16C), mechanically connected to said butterfly (16A) so as to pivot it;

a branched-off pipe (16G) placing said actuator (16C) in communication with said first hot-air pipe (10), downstream of said hot-air pressure-regulating valve (15); and modification means (16M) controlled electrically by said control device (24) and modifying the amount of cold air sent to said actuator through said branched-off pipe (16G).

9. A system as claimed in claim 8, wherein a pipe (16P) connects said second cold-air bleed pipe (11), upstream of the pivoting butterfly (16A), to said modification means (16M) to provide them with cooling.

* * * * *